US009685988B2

(12) United States Patent
Caruso et al.

(10) Patent No.: US 9,685,988 B2
(45) Date of Patent: Jun. 20, 2017

(54) ENHANCEMENT DEVICE FOR A WIRELESS ANTENNA

(71) Applicant: Endress + Hauser Process Solutions AG, Reinach (CH)

(72) Inventors: Sarah Caruso, Stuttgart (DE); Jorg Hahniche, Bad Krozingen (DE); Vincent De Groot, St. Louis (FR)

(73) Assignee: Endress + Hauser Process Solutions AG, Reinach (CH)

( * ) Notice: Subject to any disclaimer, the term of this patent is extended or adjusted under 35 U.S.C. 154(b) by 0 days.

(21) Appl. No.: 14/968,238

(22) Filed: Dec. 14, 2015

(65) Prior Publication Data

US 2016/0173163 A1 Jun. 16, 2016

(30) Foreign Application Priority Data

Dec. 15, 2014 (DE) ........................ 10 2014 118 617

(51) Int. Cl.
*H04B 1/38* (2015.01)
*H04B 1/40* (2015.01)
*H04B 7/15* (2006.01)

(52) U.S. Cl.
CPC ................. *H04B 1/40* (2013.01); *H04B 7/15* (2013.01); *G05B 2219/33192* (2013.01)

(58) Field of Classification Search
CPC . H04B 1/40; H04B 3/23; H04B 1/403; H04B 1/30; H04B 1/28; H04L 27/2601;
(Continued)

(56) References Cited

U.S. PATENT DOCUMENTS 8,437,692 B2 5/2013 Bella
9,083,580 B2 7/2015 Schmidt
(Continued)

FOREIGN PATENT DOCUMENTS

DE 102008031406 A1 1/2010

OTHER PUBLICATIONS

German Search Report, German Patent Office, Munich, Jul. 31, 2015.
(Continued)

*Primary Examiner* — Zewdu Kassa
(74) *Attorney, Agent, or Firm* — Bacon & Thomas, PLLC

(57) ABSTRACT

An enhancement device for a wireless antenna. The wireless antenna serves for transmitting and receiving wireless signals for wireless data transmission. The wireless signals comprise a first transmission protocol and a first transmission frequency. A connecting element is provided, which connects the enhancement device to the wireless antenna. A first transmitting-/receiving unit is provided, which serves to receive transmission wireless signals from the wireless antenna. A converter is provided which is embodied to convert the transmission wireless signals from the wireless antenna into a second transmission protocol and/or into a second transmission frequency. A second transmitting-/receiving unit is provided, which serves to transmit the converted transmission wireless signals, wherein a circuit is provided, which is embodied to harvest energy from the received transmission wireless signals.

11 Claims, 2 Drawing Sheets

(58) Field of Classification Search
CPC ... H04L 1/0025; H04L 1/0003; H04L 1/0071; H04L 5/0007; H04L 1/0009; H04L 27/0008; H04L 27/2647; H04L 1/20; H04N 5/4401
USPC .......................................... 375/219, 316, 295
See application file for complete search history.

(56) References Cited

U.S. PATENT DOCUMENTS

| | | | | |
|---|---|---|---|---|
| 2003/0087677 | A1* | 5/2003 | Miller | H04B 1/04 455/572 |
| 2006/0017626 | A1* | 1/2006 | Kannan | H01Q 1/088 343/702 |
| 2011/0110291 | A1 | 5/2011 | Ishii | |
| 2011/0216695 | A1 | 9/2011 | Orth | |
| 2012/0236768 | A1 | 9/2012 | Kolavennu | |
| 2014/0266034 | A1 | 9/2014 | Lee et al. | |
| 2015/0043424 | A1* | 2/2015 | Mitchell | H01Q 1/243 370/328 |

OTHER PUBLICATIONS

European Search Report, European Patent Office, Munich, May 19, 2015.

* cited by examiner

ENHANCEMENT DEVICE FOR A WIRELESS ANTENNA

TECHNICAL FIELD

The invention relates to an enhancement device for a wireless antenna, wherein the wireless antenna serves for transmitting and receiving wireless signals for wireless data transmission, the wireless signals comprise a first transmission protocol and a first transmission frequency.

BACKGROUND DISCUSSION

In industrial settings wireless communication is of growing importance. The application of wireless communication has led to an increased diversity and increased rate of development of wireless solutions. In particular, standards and communication protocols are continually changing and developing. This high rate of change presents a challenge in process automation and control technology because the installed basis of field devices, which are installed to monitor and control processes, must continually be updated and/or replaced in order to conform to the latest developments in wireless communication technology.

In automation technology, especially in process automation technology, field devices serving to register and/or influence process variables are often applied. For registering process variables, sensors, which are integrated, for example, in fill level measuring devices, flow measuring devices, pressure and temperature measuring devices, pH and redox potential measuring devices, conductivity measuring devices, etc., serve to register the corresponding process variables fill level, flow, pressure, temperature, pH value, or conductivity. Actuators serve for influencing process variables; such actuators can be, for example, valves or pumps, via which the flow of a liquid in a pipeline section or the fill level in a container can be changed. In principle, all devices, which are applied near to the process and deliver, or process, process relevant information, are referred to as field devices. In connection with the invention, remote I/Os, wireless adapters, or, generally, electronic components, which are arranged on the field level, are understood to be field devices. Many such field devices are available from the Endress+Hauser group of companies.

For various reasons, completely replacing or updating the hardware and/or software of an installed basis of field devices is not always possible and generally involves a large cost.

In the US patent U.S. Pat. No. 6,937,615 B1, a solution is presented in which a so-called 'dual stack' system is described. Here, a dual purpose bridge for wireless communication allows both a low frequency wireless communication standard and a high frequency communication standard to operate for a particular wireless communications device. However, this solution also requires the development and implementation of additional hardware depending on the application and reduces power consumption only by using the low frequency and less complex standard with a lower bit rate.

SUMMARY OF THE INVENTION

The object of the invention is to provide a simple and cost effective way of retrofitting a wireless capable device in order to increase the devices ability to wirelessly transmit and/or receive data.

The object of the invention is achieved with an enhancement device for a wireless antenna, wherein the wireless antenna serves for transmitting and receiving wireless signals for wireless data transmission. The wireless signals comprise a first transmission protocol and a first transmission frequency, wherein a connecting element is provided, which connects the enhancement device to the wireless antenna. A first transmitting-/receiving unit is provided, which serves to receive transmission wireless signals from the wireless antenna, wherein a converter is provided which is embodied to convert the transmission wireless signals from the wireless antenna into a second transmission protocol and/or into a second transmission frequency. A second transmitting-/receiving unit is provided, which serves to transmit the converted transmission wireless signals, and a circuit is provided, which is embodied to harvest energy from the received transmission wireless signals. In this way, a field device with a wireless antenna can be modified in a simple and economic way with an enhancement device for a wireless antenna that can convert a transmission/reception protocol of a transmission/reception signal into another transmission/reception protocol and/or a transmission/reception signal frequency into another transmission/reception signal frequency. It is particularly beneficial that the enhancement device can harvest energy from the wireless antenna itself so as to preserve the advantages that wireless communication offers such as flexibility, mobility and reduced cost for wiring.

The object of the invention is likewise achieved with an enhancement device for a wireless antenna, wherein the wireless antenna serves for transmitting and receiving wireless signals for wireless data transmission. The wireless signals comprise a first transmission protocol and a first transmission frequency, wherein a connecting element is provided, which connects the enhancement device to the wireless antenna. A second transmitting-/receiving unit is provided, which serves to receive reception wireless signals. The reception wireless signals comprise a second transmission protocol and/or a second transmission frequency, wherein a converter is provided which is embodied to convert the reception wireless signals into a first transmission protocol and/or into a first transmission frequency, wherein a first transmitting-/receiving unit is provided, which serves to transmit the converted reception wireless signals. A circuit is provided, which is embodied to harvest energy from the received reception signals. In this way, a field device with a wireless antenna can be modified in a simple and economic way with an enhancement device for a wireless antenna that can convert a transmission/reception protocol of a transmission/reception signal into another transmission/reception protocol and/or a transmission/reception signal frequency into another transmission/reception signal frequency. It is particularly beneficial that the enhancement device can harvest energy from the wireless antenna itself so as to preserve the advantages that wireless communication offers such as flexibility, mobility and reduced cost for wiring.

In an advantageous embodiment of the invention, the converter comprises a processing unit, which serves to convert the first transmission protocol into the second transmission protocol and/or to convert the second transmission protocol into the first transmission protocol. In its simplest form, the enhancement device is embodied simply as an electrical converter for the conversion from one frequency to another frequency, but the addition of a processing unit enables the converter to translate from one protocol to another.

In an advantageous embodiment of the enhancement device, the circuit is connected to the first transmitting-/receiving unit and/or second transmitting-/receiving unit and serves to digitalise information contained in received wireless signals as well as to convert energy contained in received wireless signals into a useable form, in particular into direct current. Energy can be harvested from wireless signals by rectifying an alternating current generated by the signals, for example through the use of diodes, and in particular shottky diodes.

In a further development, an power management unit is provided in the enhancement device, which serves to store the energy harvested from the wireless signals and to distribute the energy to components of the enhancement device.

In a further development of the inventive enhancement device the connection element is a locking ring. A locking ring represents a simple way of attaching and/or detaching said enhancement device to/from the antenna.

In an advantageous embodiment of the invention, the enhancement device comprises an additional source of energy.

In a further development of the advantageous embodiment, the additional source of energy in the enhancement device is a battery, and the battery is arranged in the power management unit.

In an advantageous embodiment of the invention, the enhancement device comprises components that serve to harvest energy from the enhancement device's surroundings, in particular by using photoelectric, thermoelectric and/or piezoelectric effects.

In another advantageous embodiment of the inventive enhancement device, an encryption logic is provided in the processor unit, which serves to encrypt and/or decrypt received wireless signals.

A further development of the invention involves the application of the enhancement device in connection with a wireless capable field device in automation technology.

Another development of the inventive enhancement device involves the application of the enhancement device for establishing an alternative communication pathway between at least two wireless capable field devices in automation technology, wherein the communication pathway serves for the transmission of security relevant data. As an example, two such enhancement devices could be attached to two field devices respectively and thereby enable the exchange of data over a so called side channel. If administrative access to field device software is restricted to data transmission over a enhancement device specific protocol—with an encryption function, for example—and/or frequency band, then an extra layer of security can be applied. Subsequent removal of the enhancement devices would then provide an added barrier to device manipulation.

BRIEF DESCRIPTION OF THE DRAWINGS

The invention will next be more closely described with reference to the following figures. The show.

DETAILED DISCUSSION IN CONJUNCTION WITH THE DRAWINGS

Figure 1:
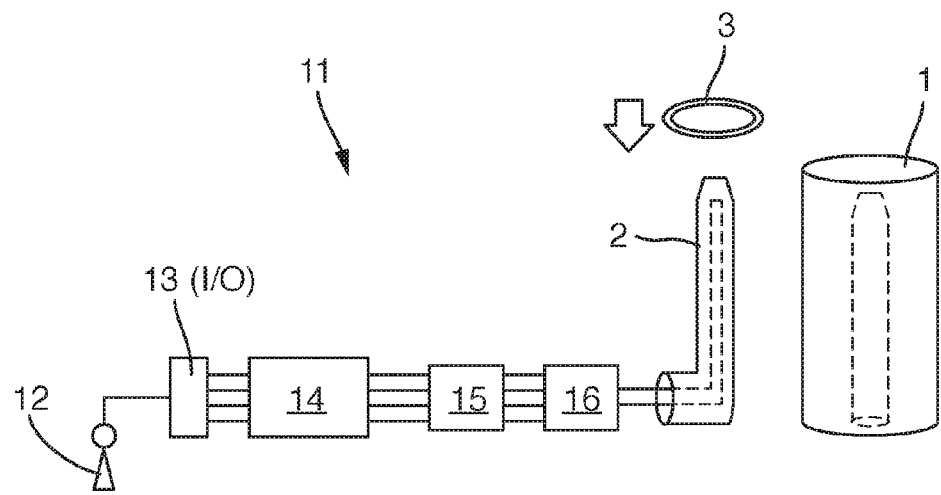
FIG. 1: is a block diagram of the circuitry of an exemplary field device with a wireless antenna and an exemplary enhancement device.

FIG. 1 shows a block diagram of the circuitry of an exemplary field device 11 with a wireless antenna 2 and an exemplary enhancement device 1. The field device 2 in this case is a measurement device having a sensor 12 for registering and/or monitoring a process parameter or variable. The sensor 12 is connected to an I/O module 13 which inputs data generated by the sensor into a microprocessor 14. The microprocessor 14 is capable of running various software programs in order to process the data from the sensor 12, for example. The microprocessor 14 also prepares data for transmission to other field devices such as a gateway or another control unit, for example. The transmission of data in a wireless network is enacted by means of a medium access unit 15 and a high frequency unit 16 for generating transmission signals. The transmission signals are traditionally coupled onto a wireless antenna 2 and thereby transmitted in the form of electromagnetic radiation in a predetermined frequency band. Wireless antennas used in process and automation technology as well as in a wide variety of other applications typically comprise a length that is on the order of a quarter wavelength of the signal that is to be transmitted. In FIG. 1 the antenna 2 shown is of this sort. An enhancement device 1 is shown next to the antenna 2, which is embodied so that it the antenna 2 can be inserted into it. In this case, the enhancement device 1 encompasses the wireless antenna 2 as a kind of sheath. The enhancement device 1 can be attached to the antenna 2 by means of a locking ring 3, for example. In this case, the locking ring 3 can be attached to the antenna 2, and the enhancement device 1 can be attached to the locking ring 3.

Figure 2:
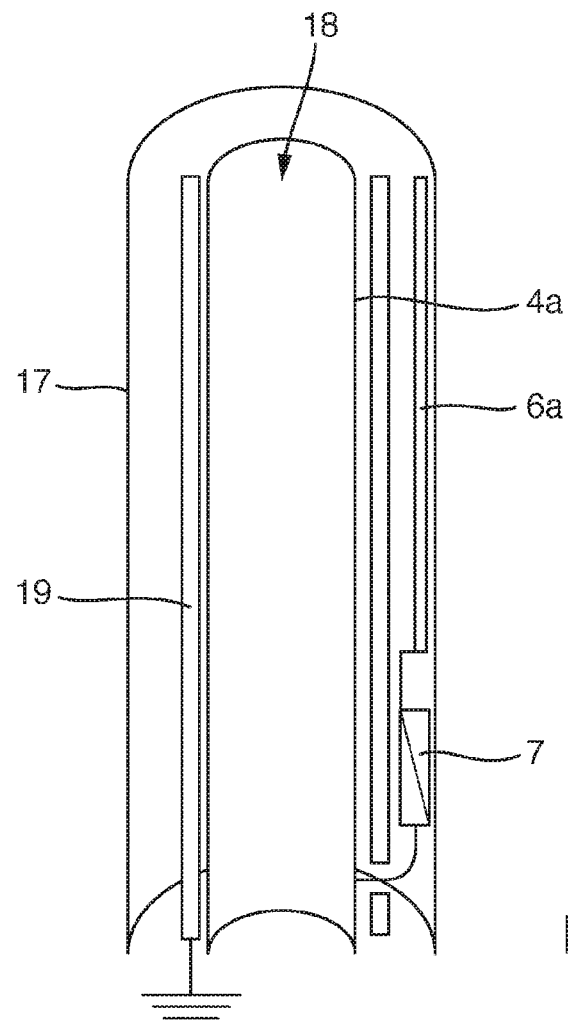
FIG. 2: a cross-section of an exemplary enhancement device.

FIG. 2 shows a cross-section of an exemplary enhancement device 1, such as the one shown in FIG. 1. The enhancement device 1 comprises an outer housing 17 and an inner hollow area 18 that is large enough to accept a wireless antenna 2 of a field device 11. The hollow area 18 is bounded by a first transmitting-/receiving element 4a for receiving signals from the antenna 2 and transmitting signals to the antenna 2. This first transmitting-/receiving element 4a is connected to an electronics unit 7 of the enhancement device 1. The electronics unit 7 of the enhancement device 1 processes the data received from the wireless antenna 2 and/or processes data that is to be transmitted to the wireless antenna 2 as will be explained in connection with FIG. 3. The electronics unit 7 of the enhancement device 1 is further connected to a second transmitting-/receiving element 6a. The second transmitting-/receiving element 6a serves to transmit signals to, and/or receive signals from, other field devices, for example.

In FIG. 2 a shielding material 19 is provided to prevent electromagnetic signals from the wireless antenna 2 from being transmitted beyond the enhancement device 1. For example, a conducting layer, such as sheet metal or even wire mesh forming a faraday cage, can be inserted and electrically grounded. This shielding material 19 can optionally be omitted in order to enable the field device 11 to communicate on dual frequency bands, or using various communication protocols. This can be especially beneficial for certain security applications that require multiple communication pathways, or for the purpose of redundancy.

Figure 3:
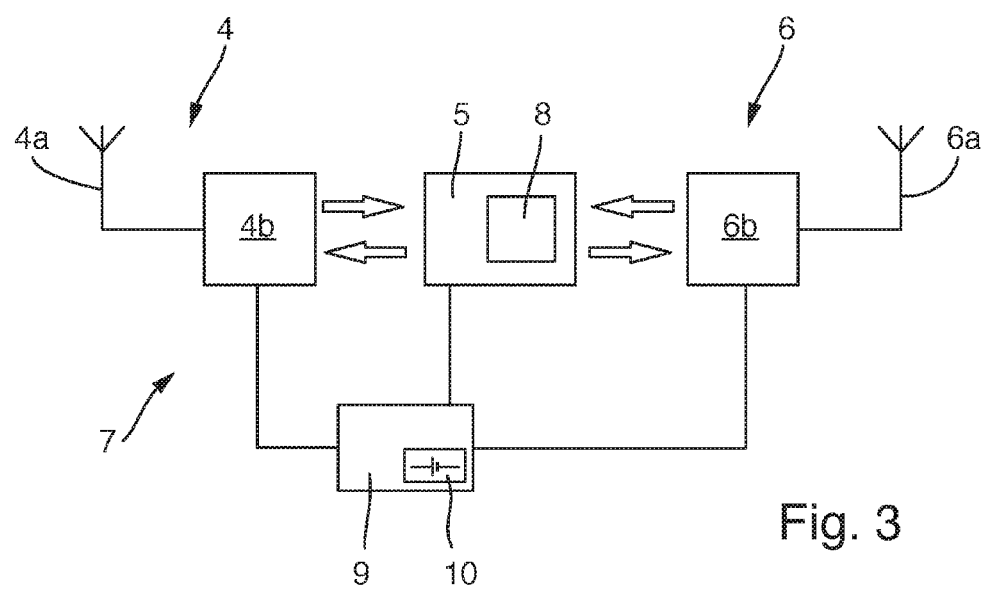
FIG. 3: a block diagram of the circuitry of an exemplary enhancement device.

In FIG. 3 a block diagram of the circuitry of an exemplary enhancement device 1 is shown. A first high frequency unit 4b is shown, which together with the first transmitting-/receiving element 4a forms a first transmitting-/receiving unit 4. The first high frequency unit 4 feeds data at a first frequency and with a first protocol to a converter 5. At the same time, energy from signals received by the first transmitting-/receiving unit 4 is fed to a power management unit 9. Methods and electrical components for extracting energy from electromagnetic signals are known in the art, for example in the US patent U.S. Pat. No. 5,043,739 A and the international publication WO2013141951 A1. The power management unit 9 stores and redistributes energy to the various other components of the enhancement device 1 such as the first and second high frequency units 4b, 6b and the converter 5. The power management unit 9 can also comprise an alternative energy source 10 such as a battery 10, for example.

As noted above, a second high frequency unit 6b is provided, which together with a second transmitting-/receiving element 6a forms a second transmitting-/receiving unit 6. This second transmitting-/receiving unit 6 serves to transmit converted signals, which comprise a second frequency and/or protocol, to other field devices, for example, and/or to receive signals from other field devices, for example. Analogous to the first transmitting-/receiving unit 4 energy from signals received by the second transmitting-/receiving unit 6 is also harvested and fed to the power management unit 9. Due to the difference in the density of the electromagnetic radiation from other field devices in comparison to that transmitted by the wireless antenna 2, it can be assumed that the majority of the harvested energy is harvested from wireless antenna 2. Advantageously, the enhancement device 1 can harvest enough energy to meet up to half of its energy requirements from the electromagnetic radiation collected by the first and second transmitting-/receiving units 4, 6. Very advantageously, the enhancement device 1 can harvest enough energy to meet up to seventy procent of its energy requirements from the electromagnetic radiation collected by the first and second transmitting-/receiving units 4, 6.

The converter 5 serves to receive data from the first and/or second transmitting-/receiving unit 4, 6 and processes the data in one of serveral ways. This conversion, in a simple embodiment, comprises a purely electrical conversion from one frequency band to another frequency band. This enables a field device 11 that is equipped to communicate wirelessly on a frequency band that is outdated or that is incompatible with other wireless devices to communicate on a different frequency band. A purely electrical conversion of this sort can be preset or can be adjustable, wherein the enhancement device 1 comprises a tuning function. The conversion, in other embodiments, can also involve a change of protocol through the application of translation logic in a processor 8 in the converter 5. This function can serve to integrate old and new devices or even serve as a means to integrate third party wireless capable devices.

The invention claimed is:

1. An enhancement device for a field device of process automation technology with a wireless antenna, the field device serves for registering and/or influencing process variables, the wireless antenna serves for transmitting and receiving wireless signals for wireless data transmission, comprising:
   a first transmission protocol and a first transmission frequency;
   a connecting element, which connects the enhancement device to said wireless antenna;
   a first transmitting-/receiving unit, which serves to receive transmission wireless signals from said wireless antenna;
   a converter which is embodied to convert the transmission wireless signals from said wireless antenna into a second transmission protocol and/or into a second transmission frequency;
   a second transmitting-/receiving unit, which serves to transmit the converted transmission wireless signals;
   a circuit which is embodied to harvest energy from the received transmission wireless signals; and
   the enhancement device is embodied so that said wireless antenna can be inserted into it.

2. The enhancement device according to claim 1, wherein:
   said converter comprises a processing unit, which serves to convert the first transmission protocol into the second transmission protocol and/or to convert the second transmission protocol into the first transmission protocol.

3. The enhancement device according to claim 1, wherein:
   said circuit is connected to said first transmitting-/receiving unit and/or said second transmitting-/receiving unit and serves to digitalise information contained in received wireless signals as well as to convert energy contained in received wireless signals into a useable form, in particular into direct current.

4. The enhancement device according to claim 1, further comprising:
   a power management unit, which serves to store the energy harvested from the wireless signals and to distribute the energy to components of the enhancement device.

5. The enhancement device according to claim 1, wherein:
   said connection element is a locking ring.

6. The enhancement device according to claim 1, wherein:
   the enhancement device comprises an additional source of energy.

7. The enhancement device according to claim 1, further comprising:
   an additional source of energy is a battery, and that the battery is arranged in the power management unit.

8. The enhancement device according to claim 1, wherein:
   the enhancement device comprises components that serve to harvest energy from the enhancement device's surroundings, in particular by using photoelectric, thermoelectric and/or piezoelectric effects.

9. The enhancement device according to claim 2, wherein:
   encryption logic is provided in said processor unit, which serves to encrypt and/or decrypt received wireless signals.

10. The application of an enhancement device according to claim 1 for establishing an alternative communication pathway between at least two wireless capable field devices in automation technology, wherein:
    the communication pathway serves for the transmission of security relevant data.

11. An enhancement device for a field device of process automation technology with a wireless antenna, wherein:
    the field device serves for registering and/or influencing process variables, the enhancement device is embodied so that the wireless antenna can be inserted into it,
    the wireless antenna serves for transmitting and receiving wireless signals for wireless data transmission;
    a first transmission protocol and a first transmission frequency;
    a connecting element, which connects the enhancement device to said wireless antenna;
    a second transmitting-/receiving unit, which serves to receive reception wireless signals, the reception wireless signals comprise a second transmission protocol and/or a second transmission frequency;
    a converter is provided which is embodied to convert the reception wireless signals into a first transmission protocol and/or into a first transmission frequency; and a first transmitting-/receiving unit is provided, which serves to transmit the converted reception wireless signals; and a circuit which is embodied to harvest energy from the received reception signals.

\* \* \* \* \*